United States Patent
Nagata et al.

(10) Patent No.: US 7,501,105 B2
(45) Date of Patent: Mar. 10, 2009

(54) NOX REDUCTION CATALYST HAVING EXCELLENT LOW-TEMPERATURE CHARACTERISTICS

(75) Inventors: Makoto Nagata, Numazu (JP); Takashi Hihara, Fuji (JP)

(73) Assignee: N.E. Chemcat Corporation, Tokyo (JP)

( * ) Notice: Subject to any disclaimer, the term of this patent is extended or adjusted under 35 U.S.C. 154(b) by 176 days.

(21) Appl. No.: 11/658,611

(22) PCT Filed: Jul. 28, 2005

(86) PCT No.: PCT/JP2005/013879

§ 371 (c)(1),
(2), (4) Date: Jan. 26, 2007

(87) PCT Pub. No.: WO2006/011575

PCT Pub. Date: Feb. 2, 2006

(65) Prior Publication Data

US 2007/0248517 A1    Oct. 25, 2007

(30) Foreign Application Priority Data

Jul. 29, 2004    (JP)    ............... 2004-222406

(51) Int. Cl.
*B01D 53/56* (2006.01)
*B01D 53/94* (2006.01)

(52) U.S. Cl. .............. 423/213.2; 423/213.5; 423/239.2; 60/274; 60/299; 60/302

(58) Field of Classification Search .............. 423/213.2, 423/213.5, 239.2; 60/274, 299, 302
See application file for complete search history.

(56) References Cited

U.S. PATENT DOCUMENTS

| | | | | |
|---|---|---|---|---|
| 4,961,917 A | * | 10/1990 | Byrne | 423/239.2 |
| 5,116,586 A | * | 5/1992 | Baacke et al. | 423/239.2 |
| 5,676,912 A | * | 10/1997 | Sharma et al. | 423/213.2 |
| 6,207,604 B1 | * | 3/2001 | Yamamoto et al. | 502/64 |
| 6,890,501 B2 | * | 5/2005 | Delahay et al. | 423/239.2 |
| 7,118,722 B2 | * | 10/2006 | Tran et al. | 423/239.2 |
| 7,182,927 B2 | * | 2/2007 | Tran et al. | 423/237 |
| 2003/0050182 A1 | * | 3/2003 | Tran et al. | 502/74 |
| 2003/0108467 A1 | * | 6/2003 | Tran et al. | 423/239.2 |
| 2005/0124486 A1 | * | 6/2005 | Tran et al. | 502/66 |
| 2008/0044331 A1 | * | 2/2008 | Schwefer et al. | 423/213.5 |

FOREIGN PATENT DOCUMENTS

JP    50 128681    10/1975

(Continued)

OTHER PUBLICATIONS

Zhilinskaya, Elena A. et al., "EPR Investigation of Fe-Exchanged Beta-Zeolites", Langmuir, vol. 19, No. 9, pp. 3595-3602, 2003.

*Primary Examiner*—Timothy C Vanoy
(74) *Attorney, Agent, or Firm*—Oblon, Spivak, McClelland, Maier & Neustadt, P.C.

(57) ABSTRACT

A NOx removal catalyst comprising a carrier that includes a zeolite, and preferably a β-zeolite, that has undergone ion exchange with iron, and ferric oxide supported on the carrier. This NOx removal catalyst can be used favorably in a selective catalytic reduction process wherein nitrogen oxides contained in the exhaust gas from a diesel engine are reduced and removed by ammonia.

5 Claims, 1 Drawing Sheet

FOREIGN PATENT DOCUMENTS

| | | |
|---|---|---|
| JP | 2 194819 | 8/1990 |
| JP | 2 293021 | 12/1990 |
| JP | 5 317650 | 12/1993 |
| JP | 7 60126 | 3/1995 |
| JP | 8 57262 | 3/1996 |
| JP | 9 103653 | 4/1997 |
| JP | 9 313946 | 12/1997 |

* cited by examiner

[Fig. 1]
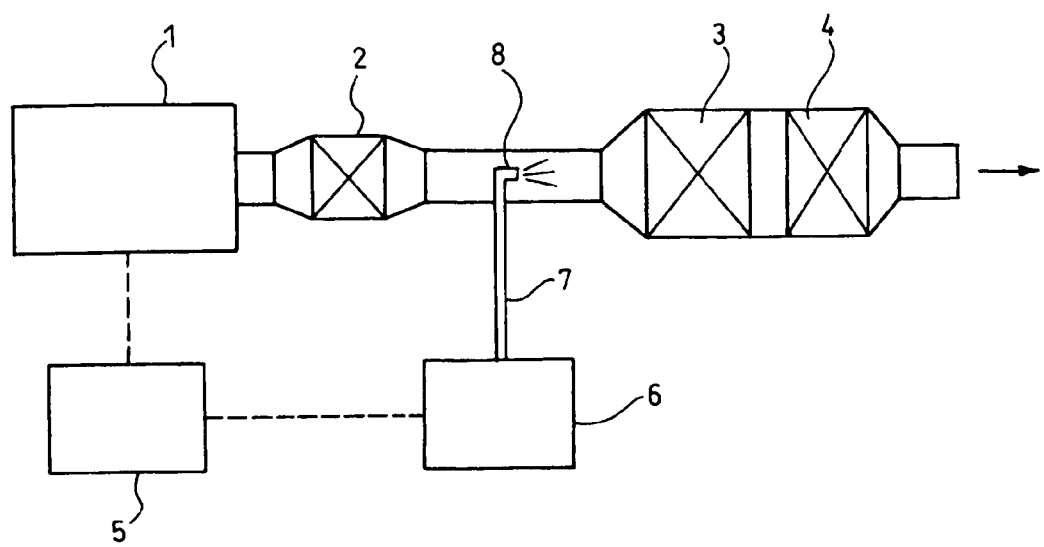

NOX REDUCTION CATALYST HAVING EXCELLENT LOW-TEMPERATURE CHARACTERISTICS

TECHNICAL FIELD

The present invention relates to a NOx removal catalyst, and more particularly to a NOx removal catalyst that can be used favorably in a selective catalytic reduction process wherein nitrogen oxides contained in the exhaust gas from a diesel engine are reduced and removed by ammonia. Furthermore, the present invention also relates to a method for purifying the exhaust gas from a diesel engine by such a selective catalytic reduction process using a NOx removal catalyst of the present invention.

BACKGROUND ART

In recent years, the exhaust gas regulations relating to nitrogen oxides (hereafter abbreviated as NOx) and the like have become considerably more stringent, and satisfying these regulations has become a pressing issue.

Numerous methods have already been proposed for removing NOx within the exhaust gas from high-temperature combustion systems. Furthermore, in the case of the exhaust gas from large boilers and the like, which represent fixed emission sources for NOx, a selective catalytic reduction process that uses ammonia as a reducing agent (hereafter referred to as a $NH_3$—SCR process) is generally employed in practical applications.

In this $NH_3$—SCR process, NOx is reduced and converted to harmless nitrogen gas and water vapor in accordance with the reaction equations shown below.

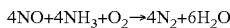

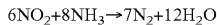

The NOx removal catalyst used in this $NH_3$—SCR process (hereafter also referred to as a SCR catalyst) typically employs a metal oxide-based catalyst such as alumina, zirconia or vanadia/titania, or a zeolite-based catalyst or the like. Furthermore, the use of a catalyst comprising titanium, tungsten, and at least one of vanadium, molybdenum and iron (patent reference 1), and the use of an iron ZSM-5 monolithic structure zeolite having a specific silica/alumina composition (patent reference 2) have also been proposed.

Furthermore, a pentasil zeolite (ZSM-5) with iron supported thereon has been proposed for removing nitrous oxide ($N_2O$), which is a contributor to global warming, from exhaust gas (patent reference 3). Moreover, in a similar manner, a method in which contact with a β-zeolite with iron supported thereon at a high temperature of 350 to 500° C. is used for removing $N_2O$ from exhaust gas has also been proposed (patent reference 4).

However, none of these proposals relate to a method for purifying the exhaust gas from the diesel engine of a NOx mobile emission source such as a truck or bus.

In the aforementioned SCR process, if ammonia is used as the reducing agent, then because ammonia has a pungent odor, is toxic, and must be transported and stored using pressurized containers, problems of safety, handling and workability arise. Application of ammonia to a NOx reduction treatment system for the exhaust gas from the diesel engine of a truck or bus offers limited practicality.

Instead of using ammonia, compounds that are solid at ambient temperature but then decompose to generate ammonia, such as ammonium carbonate, urea, cyanuric acid and melamine can also be used. These compounds are preferred, as they offer favorable handling characteristics and suffer no safety problems such as ammonia leakage, and of these compounds, urea is particularly practical as it is also inexpensive.

Urea generates ammonia via a thermal decomposition reaction (i) and a hydrolysis reaction (ii) represented by the reaction equations shown below, $$(NH_2)_2CO + H_2O \rightarrow NH_3 + NHCO \qquad (i)$$

$$NHCO + H_2O \rightarrow NH_3 + CO_2 \qquad (ii)$$

and the generated ammonia then acts as a reducing agent in the manner described above, thereby effecting a reduction reaction of the NOx within the exhaust gas. Because urea is a solid, suitable methods of supplying the urea to the above reaction system include methods in which the urea is sprayed into the gas as an aqueous solution.

[Patent Reference 1]
Japanese Laid-open publication (kokai) No. Sho 50-128681
[Patent Reference 2]
Japanese Laid-open publication (kokai) No. Hei 9-103653
[Patent Reference 3]
Japanese Laid-open publication (kokai) No. Hei 7-60126
[Patent Reference 4]
Japanese Laid-open publication (kokai) No. Hei 8-57262

DISCLOSURE OF INVENTION

Problems Invention Aims to Solve

As described above, in a method for the reduction treatment of $N_2O$ within exhaust gas using ammonia, the use of a catalyst comprising a zeolite, and more specifically a β-zeolite, with iron supported thereon under temperature conditions of 350 to 500° C. is already known. However, if the catalyst employed in a conventional $NH_3$—SCR process is applied to the reduction of the NOx within the exhaust gas from a diesel engine, then NOx reduction does not proceed adequately at the general temperature range of the exhaust gas, and the catalytic performance is particularly unsatisfactory at comparatively low temperatures (in the vicinity of 200° C., this definition also applies below), and as a result, a SCR catalyst that is suited to the reduction of NOx within exhaust gas has been keenly sought.

Accordingly, an object of the present invention is to provide a NOx removal catalyst targeted particularly at the exhaust gas of diesel engines, which can be used favorably for NOx removal by a $NH_3$—SCR process, and exhibits particularly superior NOx reduction performance at comparatively low temperatures, as well as a method for purifying an exhaust gas from a diesel engine.

Means for Solution of the Problems

As a result of intensive investigation based on the conventional technology described above, the inventors of the present invention were able to complete the present invention.

In other words, the present invention provides:
a NOx removal catalyst comprising a carrier that comprises a zeolite that has undergone ion exchange with iron, and ferric oxide supported on the carrier.

In addition, the present invention also provides a method for purifying exhaust gas from a diesel engine, wherein the exhaust gas from the diesel engine is brought into contact with the above NOx removal catalyst.

BRIEF DESCRIPTION OF DRAWINGS

FIG. 1 is a schematic illustration showing an example of an exhaust gas purification system that employs a selective catalytic reduction process for the exhaust gas from a diesel engine.

BEST MODE OF CARRYING OUT INVENTION

As follows is a more detailed consideration of the present invention.

Treatment System for Diesel Engine Exhaust Gas

First is a general overview, with reference to FIG. 1, of a treatment system for a diesel engine exhaust gas that employs a SCR process using urea as a source for generating ammonia as the reducing agent. FIG. 1 has been drawn solely for the purposes of explanation, and the SCR process is in no way limited by FIG. 1, and moreover, the potential applications of the NOx removal catalyst of the present invention are also not limited to the system described here.

An exhaust gas generated by a diesel engine 1 passes through a first oxidation catalyst 2, a SCR catalyst 3 and a second oxidation catalyst 4 provided within the exhaust gas line, and is then expelled externally. Under the control of an engine control unit 5 and based on a preset program, a urea water supply unit 6 feeds urea water under pressure through a urea water supply line 7, and sprays the urea water out from a nozzle 8 positioned within the exhaust gas line. The sprayed urea water is mixed with the high-temperature exhaust gas and generates ammonia by hydrolysis, and this ammonia reduces the NOx within the exhaust gas via the action of the SCR catalyst 3.

The first oxidation catalyst 2 performs the functions of oxidizing the NO within the exhaust gas and converting it to $NO_2$, thereby altering the $NO/NO_2$ ratio within the exhaust gas supplied to the SCR catalyst 3, and oxidizing and decomposing the soluble organic fraction (SOF). Furthermore, the second oxidation catalyst 4 has a main function of oxidizing and decomposing any ammonia that leaks from the SCR catalyst 3 in an unreacted state.

Zeolite

A carrier comprising a zeolite that has undergone ion exchange with iron is used to prepare a catalyst of the present invention.

A zeolite is a porous substance with a composition represented by an average composition formula shown below:

(wherein, M represents a cation, x represents the valency of M, and n represents a number exceeding 0 but less than 1).

Examples of the cation M include $H^+$, $Na^+$, and a quaternary ammonium ion. Furthermore, zeolites exist in a variety of types, including β, A, X, Y, pentasil (ZSM-5) and MOR zeolites, although a β-zeolite is preferred.

β-zeolites have a unit cell composition represented by the compositional formula shown below:

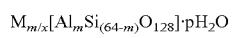

(wherein, M and x are as defined above, m represents a number exceeding 0 but less than 64, and p represents a number of 0 or greater), and are classified as synthetic zeolites with a tetragonal system. These β-zeolites generally have linear pores of comparatively large diameter that are aligned in a single direction, and comparatively complex three dimensional pore structures comprising curved pores that intersect with the linear pores, and because they exhibit properties that include ready diffusion of the cations during ion exchange and ready diffusion of gas molecules such as ammonia, they can be used favorably as a raw material for a catalyst of the present invention.

Furthermore, the basic structure of the zeolite is a structural unit having an oxygen atom at the four apexes of a four-surface structure, namely, a three dimensional crystal structure comprising $[SiO_{4/2}]$ units and $[AlO_{4/2}]^-$ units. In this basic structure, the molar ratio of $SiO_2/Al_2O_3$ (hereafter referred to as "SAR") is typically within a range from 15 to 300, and preferably from 15 to 100, and even more preferably from 15 to 60. The $[AlO_{4/2}]^-$ units within the structure form ion pairs with the aforementioned cations. Because the zeolite includes this type of ion pair structure, it is able to undergo ion exchange with other cations.

Amongst the preferred β-zeolites, β-zeolites in which the cations are quaternary ammonium ions ($NH_4^+$) are particularly preferred, and the use of β-zeolites in which, as described above, the SAR typically falls within a range from 15 to 300, and preferably from 15 to 100, and even more preferably from 15 to 60, is desirable.

Provided the SAR falls within the above range, problems such as Al elimination from the zeolite backbone structure or destruction of ion exchange site structures or the skeleton structure, which are caused by a combination of moisture contained within the exhaust gas and the exhaust gas temperature, and result in a loss of durability and stability for the catalyst, leading to a deterioration in the catalytic activity, can be prevented, thus enabling a catalyst with excellent activity to be more readily obtained.

Furthermore, in the case of quaternary ammonium ions ($NH_4^+$), the salts generated as residual by-product components during ion exchange do not act as catalyst poisons and have no adverse effects on the catalytic activity, and consequently such ammonium ions are preferred as the β-zeolite cations.

Ion Exchange

As described above, a catalyst of the present invention uses a zeolite that has undergone iron ($Fe^{3+}$) ion exchange (hereafter also referred to as an "ion exchanged zeolite") as a carrier.

In considering the ion exchange proportion, based on the fact that one iron ion ($Fe^{3+}$) and three of the aforementioned $[AlO_{4/2}]^-$ units that represent the monovalent ion exchange sites within the zeolite form an ion pair, the ion exchanged zeolite is preferably prepared so that the ion exchange ratio, represented by a formula (1) shown below:

[number of mols of iron ions($Fe^{3+}$)incorporated within a unit weight of the zeolite as a result of the ion exchange/{(number of mols of $Al_2O_3$incorporated within a unit weight of said zeolite)×(2/3)}]×100        (1)

is typically within a range from 10 to 100%, and preferably from 12 to 92%, and even more preferably from 15 to 80%. If this ion exchange ratio is 92% or less, and preferably 80% or less, then the backbone structure of the zeolite develops greater stability, and the heat resistance and lifespan of the catalyst improve, enabling more stable catalytic activity to be achieved. However, if the ion exchange ratio is too low, the selective reduction effect diminishes. An ion exchange ratio of 100% means that all of the cations within the zeolite, for example all of the $NH_4^+$ ions (in a ratio of three ions for each $Fe^{3+}$ ion), undergo ion exchange with $Fe^{3+}$ ions.

Furthermore, the ion exchange ratio (%) described above can be calculated on the basis of the aforementioned SAR value within the zeolite and the analyzed value for the quantity (% by weight) of iron ions ($Fe^{3+}$) within the ion exchanged zeolite. By adjusting this ion exchange ratio (%) so that it falls within the above range, a carrier can be obtained that exhibits a satisfactorily high catalytic activity, and in particular, an improved level of catalytic activity at comparatively low temperatures.

There are no particular restrictions on the method used for obtaining the ion exchanged zeolite. Using the case of a β-zeolite with $NH_4^+$ cations as an example, the zeolite can be obtained by conducting an ion exchange treatment of the zeolite using an aqueous solution of a water-soluble iron-containing compound (such as ferric nitrate), isolating the resulting ion exchange treatment product, washing the isolated product with water to remove any excess water-soluble iron-containing compound, and then drying the product. During the ion exchange treatment, a salt (such as ammonium nitrate) is generated as a by-product and eluted into the aqueous phase.

The above ion exchange ratio can be suitably adjusted by appropriate setting of factors such as the concentration and temperature of the above aqueous solution, and the ion exchange treatment time. Particularly in those cases where an ion exchanged zeolite with a high ion exchange ratio is required, the concentration of the above aqueous solution should be high, the aforementioned ion exchange treatment should be conducted for a satisfactorily long period, and if required, the treatment temperature may also be adjusted as appropriate.

Supporting of Ferric Oxide

A feature of the catalyst of the present invention is the supporting of ferric oxide ($Fe_2O_3$) on a carrier comprising an aforementioned ion exchanged zeolite.

As described above, the NOx reduction reactions within a SCR process occur in accordance with the three reaction equations shown below.

$$4NO+4NH_3+O_2 \rightarrow 4N_2+6H_2O \quad (I)$$

$$6NO_2+8NH_3 \rightarrow 7N_2+12H_2O \quad (II), \text{ and}$$

$$NO+NO_2+2NH_3 \rightarrow 2N_2+3H_2O \quad (III)$$

In the above reaction equations, the nitrogen dioxide ($NO_2$) that is reduced to $N_2$ by the reactions of the equations (II) and (III) is typically produced by the first oxidation catalyst 2 (of FIG. 1), as described above and in accordance with an oxidation reaction equation (VI) show below, and this nitrogen dioxide is supplied to the SCR catalyst 3 together with NO.

$$2NO+O_2 \rightarrow 2NO_2 \quad (VI)$$

At comparatively low temperatures, it is known that of the reactions represented by the above equations (I), (II) and (III), the reaction rate of the reduction reaction represented by the equation (III) is the fastest. In other words, under the conditions described above, the NOx reduction performance (namely, the NOx conversion) of the SCR catalyst 3 is significantly dependent on the reaction proportion that follows the equation (III).

Accordingly, preferentially promoting the reduction reaction represented by the equation (III) is effective in improving the NOx reduction performance of the above system at comparatively low temperatures, and as a result, adjusting the $NO/NO_2$ molar ratio within the exhaust gas supplied to the SCR catalyst 3 so as to increase the $NO_2$ content and achieve a $NO/NO_2$ molar ratio of 1 is advantageous.

However, designing the first oxidation catalyst 2 based solely on its NO oxidation characteristics at comparatively low temperatures is difficult, and designing such a first oxidation catalyst 2 tends to generate other problems in terms of the $NO/NO_2$ ratio at other temperatures and the generation of sulfates.

As a result, the inventors of the present invention employed a catalyst in which ferric oxide was supported on the aforementioned ion exchanged zeolite. In other words, by utilizing the oxidation function of the ferric oxide within the catalyst of the present invention, the NO supplied to the catalyst is oxidized in accordance with the above equation (VI), generating $NO_2$ at the catalyst surface.

By combining the $NO_2$ generated at the surface of the catalyst of the present invention in the manner described above with the $NO_2$ within the exhaust gas that has passed through the first oxidation catalyst 2, the ratio between NO and $NO_2$ at the catalyst surface can be set to a value that matches the reaction conditions of the aforementioned equation (III), namely a $NO/NO_2$ (molar ratio) value that is substantially 1, and by promoting the reduction reaction of the equation (III), which has the fastest reaction rate amongst the reactions represented by the above equations (I), (II) and (III), the catalyst of the present invention exhibits the notable effect of enabling the realization of a high level of NOx reduction performance.

The quantity of ferric oxide supported on the catalyst of the present invention should be sufficient to ensure the production of an adequate quantity of $NO_2$, and is typically within a range from 0.1 to 15% by weight, and preferably from 0.5 to 10% by weight, relative to the catalyst (namely, the combination of the aforementioned ion exchanged zeolite and the ferric oxide). If this supported quantity is either too small or too large, then the above $NO/NO_2$ (molar ratio) value deviates significantly from 1, meaning the reduction reaction of the above equation (III) cannot be promoted, which causes a deterioration in the NOx reduction characteristics.

An example of a method of supporting the ferric oxide on the carrier comprising the above ion exchanged zeolite involves impregnating the ion exchanged zeolite with an aqueous solution of a water-soluble iron-containing compound (such as ferric nitrate), supporting the water-soluble iron-containing compound on the carrier, and then drying and baking the treated product.

Use of a Support Substrate, Preparation of a Substrate-Supported Catalyst

A catalyst of the present invention preferably comprises an aforementioned ferric oxide-carrying ion exchanged zeolite that is further supported on a support substrate, and the use of this type of support substrate is particularly useful when the present invention is used as a catalyst for purifying the exhaust gas from a diesel engine.

Examples of the support substrate include flow-through type ceramic or metallic heat resistant three dimensional structures. Specific examples of these three dimensional structures include monolithic structures, foams or meshes or the like in which the cell cross-sectional shape is rectangular, square, or triangular or the like, and of these possibilities, ceramic monolithic structures such as cordierite are preferred. Furthermore, the cell density of the honeycomb monolithic structure is typically within a range from 100 to 900 cpsi, and preferably from approximately 300 to 600 cpsi.

A catalyst of the present invention supported on a support substrate can be prepared by a conventional wash-coat method, namely, by immersing the support substrate in a slurry comprising the above ferric oxide-carrying ion exchanged zeolite, and where necessary a binder such as zirconium acetate, alumina sol or silica sol, removing the support substrate and removing any excess slurry by air blowing so that a predetermined weight of the catalyst component is supported on the support substrate, and then conducting drying and baking. There are no particular restrictions on the conditions employed in this wash-coat method.

Furthermore, the combined support quantity of the ion exchanged zeolite and the ferric oxide can be set in accordance with factors such as the capacity of the target engine, although the supported quantity per unit volume of the support substrate is typically within a range from 25 to 270 g/L, and preferably from approximately 40 to 190 g/L.

Method for Purifying Diesel Engine Exhaust Gas

By using an aforementioned ferric oxide-carrying ion exchanged zeolite as the SCR catalyst 3 within the treatment system for a diesel engine exhaust gas that employs a SCR process shown in FIG. 1, and then bringing the exhaust gas from the diesel engine into contact with this SCR catalyst, the NOx within the exhaust gas from the diesel engine can be effectively removed and purified.

The temperature of the exhaust gas from the diesel engine is typically not more than 600° C. In a method for purifying exhaust gas from a diesel engine according to the present invention, an excellent NOx reduction effect can be achieved for exhaust gas temperatures in the vicinity of 200° C., typically within a range from 130 to 250° C., and preferably from 180 to 220° C.

EXAMPLES

As follows is a more detailed description of the present invention based on an example and a series of comparative examples.

Example 1

(1) Using a β-zeolite in which the cations were quaternary ammonium ions ($NH_4^+$) (SAR: 25) and an aqueous solution of ferric nitrate, an iron ($Fe^{3+}$) ion exchanged β-zeolite ($Fe^{3+}$ content: 0.70% by weight ($Fe_2O_3$ equivalent weight: 1.0% by weight), ion exchange ratio: 30.7%, hereafter referred to as the "ion exchanged zeolite A") was prepared.

(2) The ion exchanged zeolite A obtained in (1) above was immersed for a second time in an aqueous solution of ferric nitrate, thereby impregnating and supporting ferric nitrate within the zeolite. Subsequently, the zeolite was baked (at 500° C. for 5 hours), yielding an ion exchanged zeolite A with ferric oxide supported thereon. This zeolite is termed the "ferric oxide-carrying ion exchanged zeolite A".

The quantity of ferric oxide supported within the ferric oxide-carrying ion exchanged zeolite A was 4.0% by weight.

(3) Using the aforementioned ferric oxide-carrying ion exchanged zeolite A and zirconium acetate (as a binder) in a weight ratio of 100:4.3, the two components were mixed together and ground in a pot mill, yielding a powder in which the average particle size of 90% by weight of all the particles was 7.1 μm. Subsequently, this powder was used to prepare a water-based slurry with a solid fraction concentration of 30% by weight.

A flow-through monolithic structure composed of cordierite (cell cross-sectional shape: square, cell density: 400 cpsi, wall thickness: 6 mil (152.4 μm)) was immersed in the above water-based slurry, subsequently removed from the slurry and air blown to remove the excess slurry, dried at 180° C. for 10 minutes, and then baked in an electric oven at 450° C. for 30 minutes, thereby yielding a catalyst of the present invention. This catalyst is termed the "catalyst A".

The supported quantity of the ferric oxide-carrying ion exchanged zeolite A per unit volume of the catalyst A was 120 g/L.

Comparative Example 1

With the exceptions of not conducting the above step (2) in the example 1 of supporting the ferric oxide on the zeolite, and using the aforementioned ion exchanged zeolite A instead of the ferric oxide-carrying ion exchanged zeolite A described in (3) of the same example, a comparative catalyst was prepared in the same manner as the example 1. This catalyst is termed the "catalyst B".

The supported quantity of the ion exchanged zeolite A per unit volume of the catalyst B was 120 g/L.

Comparative Example 2

Without conducting the ion exchange process described in step (1) of the example 1, a comparative catalyst with ferric oxide supported thereon was prepared in the manner described below.

A β-zeolite (SAR: 25, cations: $H^+$), zirconium acetate (as a binder), and ferric oxide powder were mixed together sequentially and crushed in a pot mill using a weight ratio of 100:5.8:4.5, yielding a powder in which the average particle size of 90% by weight of all the particles was 7.1 μm. Subsequently, this powder was used to prepare a water-based slurry with a solid fraction concentration of 32% by weight. Using this slurry, a comparative catalyst was prepared in the same manner as step (3) of the above example 1. This catalyst is termed the "catalyst C".

The supported quantity of ferric oxide relative to the combination of the β-zeolite and the ferric oxide was 5.0% by weight. Furthermore, the supported quantity of the combination of the β-zeolite and the ferric oxide per unit volume of the catalyst C was 120 g/L.

Comparative Example 3

With the exception of not using the ferric oxide powder described in the above comparative example 2, a comparative catalyst was prepared in the same manner as the comparative example 2. This catalyst is termed the "catalyst D".

The supported quantity of the β-zeolite per unit volume of the catalyst D was 120 g/L.

The NO oxidation performance and the NOx reduction performance for a diesel engine exhaust gas were evaluated for each of the catalysts A through D obtained above using the evaluation methods descried below.

Evaluation Methods

<Measurement of NO Oxidation Performance>
Measurement Conditions
Catalyst size: diameter 24 mm×length 13 mm (cell density: 400 cpsi, wall thickness: 6 mil (152.4 μm))
Gas flow rate: 1,000 mL/minute
Space velocity: 10,000 h$^{-1}$
Introduced model gas composition: NO=400 ppm (by volume), air=the remainder
Catalyst inlet temperature: 200° C.
Measurement Method The model gas was passed through each of the catalysts under the conditions listed above, the NO$_2$ (OUT) concentration (ppm (by volume)) at the catalyst outlet was measured using a low-concentration stack gas NOx meter (product name: Model-5100H, manufactured by Nippon Thermoelectron Co., Ltd.), and the NO→NO$_2$ conversion (%) was calculated using the formula shown below.

NO→NO$_2$ conversion(%)=(400−NO(OUT))/400×100

The measurement results are shown in Table 1.

<Preparation of Sample for NOx Reduction Performance Testing>

In order to evaluate the NOx reduction performance under actual loading conditions, the catalyst was subjected to a durability treatment using a gas circulation-type electric oven, by conducting a hydrothermal treatment at 800° C. for 5 hours in an atmosphere containing 10 vol % of moisture. Following completion of this durability treatment, the catalyst was used as a sample for the NOx reduction performance testing described below.

<Measurement of NOx Reduction Performance>
Measurement Conditions
Engine capacity: 8.0 L (T/I)
Operating conditions: 1,500 rpm
Catalyst inlet temperature: 200° C.
Exhaust gas space velocity: 71,600 h$^{-1}$ (constant)
Concentration of urea water: 32.5% by weight
Urea water spray volume: equivalent quantity of ammonia/NOx content within exhaust gas(molar ratio)=1.0
Apparatus for measuring NOx reduction performance: a system was employed in which a first sampling device, a catalytic DPF (platinum metal quantity: 2 g/L), a urea water spray nozzle, the durability-treated catalyst, and a second sampling device were arranged within the engine exhaust gas line in sequence from the upstream side.
Measurement Method The engine exhaust gas was sampled using the first sampling device, and the NOx (IN) concentration (ppm) prior to NOx reduction treatment was measured. The urea water was sprayed into the line from the nozzle under the conditions described above. The exhaust gas exiting the durability-treated catalyst was sampled by the second sampling device, the NOx (OUT) concentration (ppm) following NOx reduction treatment was measured, and the NOx conversion (%) was calculated using the formula shown below.

NOx conversion(%)=[{NOx(IN)−NOx(OUT)}/NOx(IN)]×100

The measurement results are shown in Table 1.

TABLE 1

| | Zeolite component composition | | | |
|---|---|---|---|---|
| | Ion exchanged Fe$^{3+}$ (% by weight) * | Supported Fe$_2$O$_3$ (% by weight) | NO → NO$_2$ conversion (%) | NOx conversion (%) |
| Example 1 | 1.0 | 4.0 | 53.8 | 43.7 |
| Comparative example 1 | 1.0 | — | 21.4 | 27.0 |
| Comparative example 2 | — | 5.0 | 16.1 | 19.0 |
| Comparative example 3 | — | — | 2.0 | 1.0 |

Note:
* The Fe$_2$O$_3$ equivalent quantity for Fe$^{3+}$ within the ion exchanged zeolite Observations The catalyst D (from the comparative example 3) which was substantially a simple β-zeolite exhibited poor NO oxidation performance, and the NOx reduction performance was also substantially non-existent. In comparison, it is evident that the catalyst B (from the comparative example 1) that had undergone ion exchange with iron (Fe$^{3+}$) exhibited a conventional level of NOx reduction performance.

Compared with the catalyst B (from the comparative example 1), the catalyst A of the present invention (from the example 1) that also had ferric oxide supported thereon exhibited a dramatic improvement in the NOx reduction performance at 200° C. It is thought that this improvement is a result of the function of the ferric oxide within the catalyst A in producing NO$_2$ by oxidation of NO, a function which is evident from the result of the NO oxidation performance of the catalyst C (from the comparative example 2) with ferric oxide supported thereon, which enables the NO/NO$_2$ (molar ratio) value at the catalyst surface to be adjusted to a value that is substantially 1, thereby promoting the NOx reduction reaction with the fast reaction rate.

Accordingly, from the results of the example and the comparative examples it is evident that when applied to a selective catalytic reduction process for the exhaust gas from a diesel engine, a catalyst of the present invention exhibits excellent NOx reduction performance for exhaust gases at a low temperature in the vicinity of 200° C.

INDUSTRIAL APPLICABILITY

When a NOx removal catalyst of the present invention is applied to a selective catalytic reduction process that uses ammonia to reduce and remove NOx from within a diesel engine exhaust gas, particularly superior NOx reduction performance is achieved at comparatively low temperatures, enabling NOx to be removed at a high conversion.

The invention claimed is:

1. A method for purifying exhaust gas from a diesel engine by selective catalytic reduction, comprising supplying urea into said exhaust gas from a diesel engine, and then bringing said exhaust gas at from 180 to 220° C. into contact with a NOx removal catalyst, said NOx removal catalyst compromising a carrier and ferric oxide supported on said carrier, said carrier comprising a β-zetolite that has undergone ion exchange with iron, wherein an iron ion exchange ratio, represented by a formula (1):

[number of mols of iron ions ($Fe^{3+}$) incorporated within a unit weight of said zeolite by said ion exchange/{(number of mols of $Al_2O_3$ incorporated within a unit weight of said zeolite)×(2/3)}]×100   (1)

is within a range from 12 to 92%.

2. The method according to claim 1, wherein a supported quantity of said ferric oxide within said catalyst is within a range from 0.1 to 15% by weight.

3. The method according to claim 1, wherein a molar ratio of $SiO_2/Al_2O_3$ within said zeolite is within a range form 15 to 300.

4. The method according to claim 1, wherein said catalyst further comprises a support substrate, wherein said ferric oxide supported on said carrier is supported on said support substrate.

5. The method according to claim 4, wherein a supported quantity of a combination of said carrier and said ferric oxide is within a range from 25 to 270 g/L per unit volume of said support substrate.

* * * * *